Patented June 25, 1935

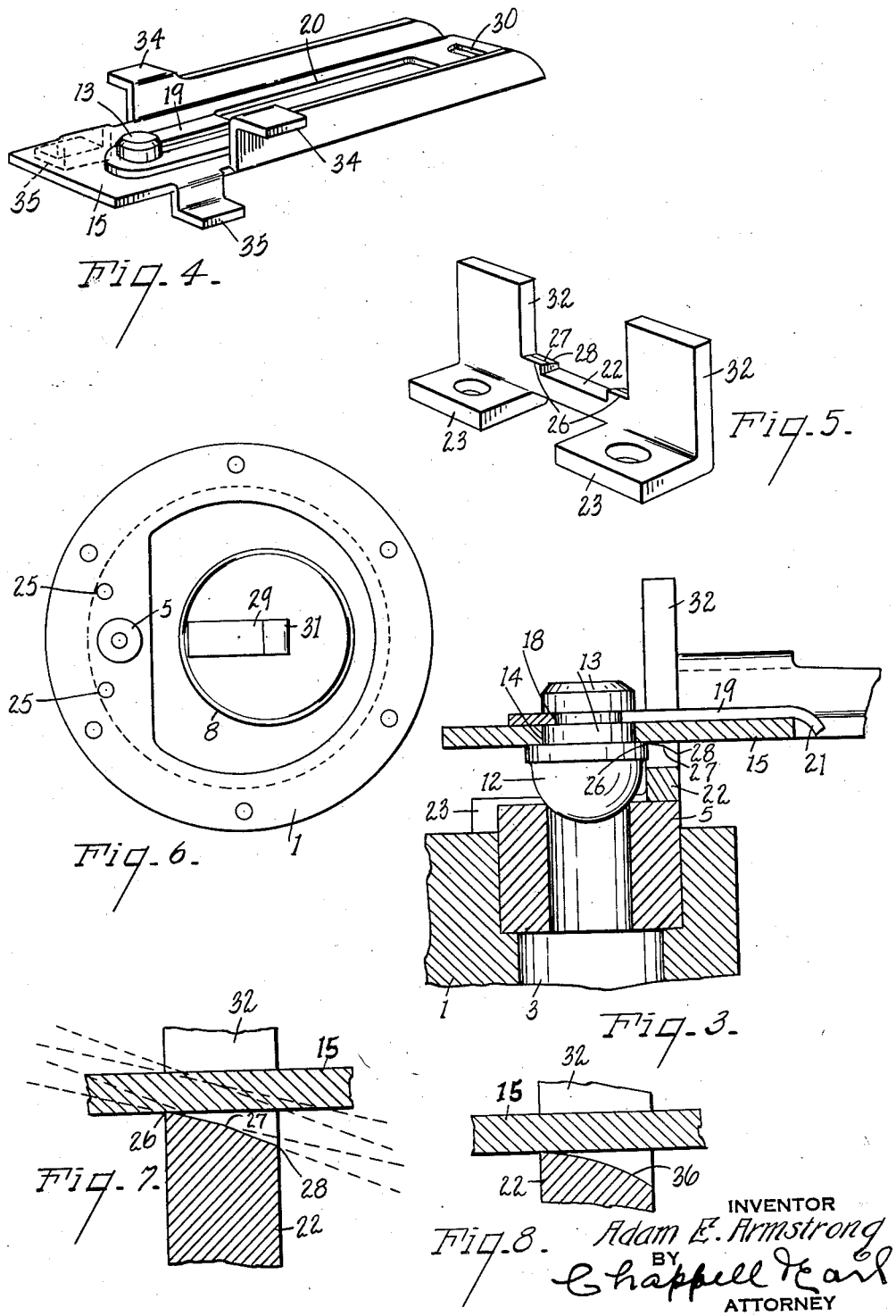

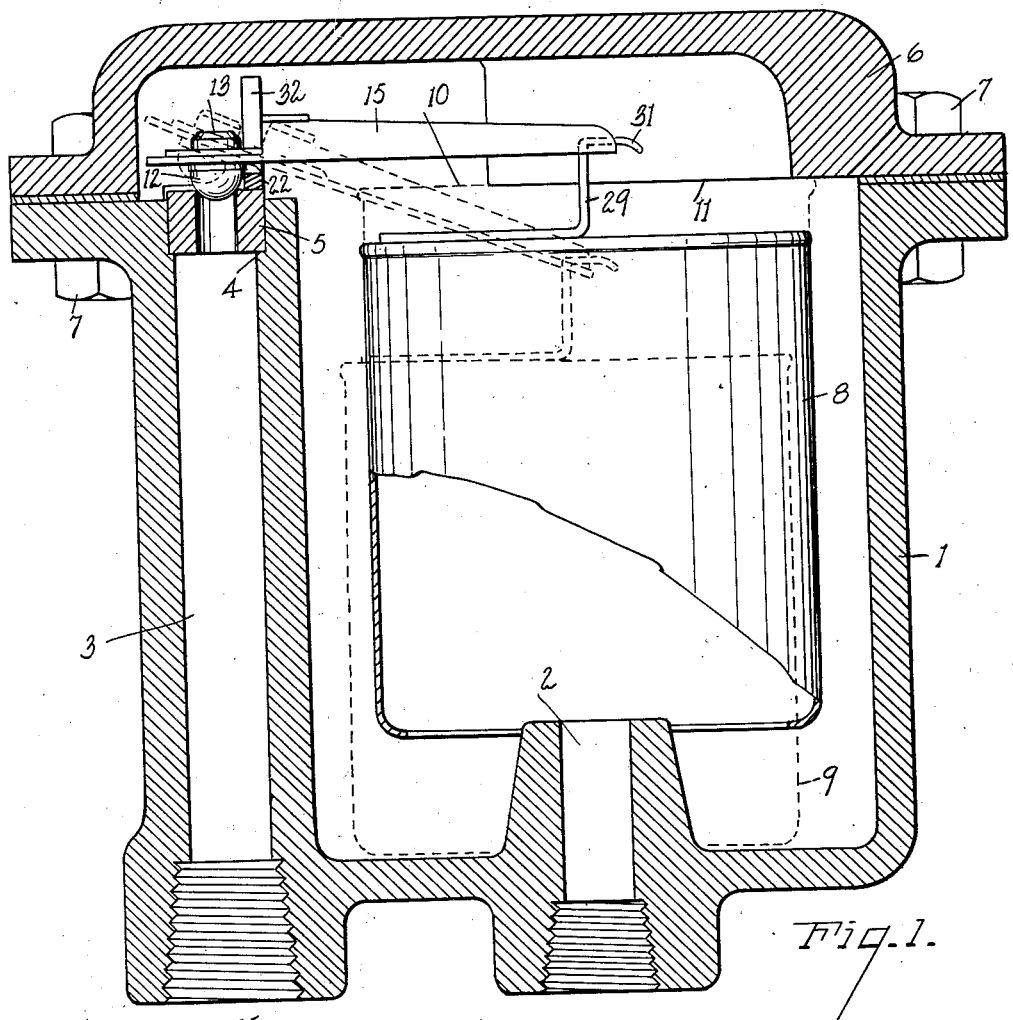
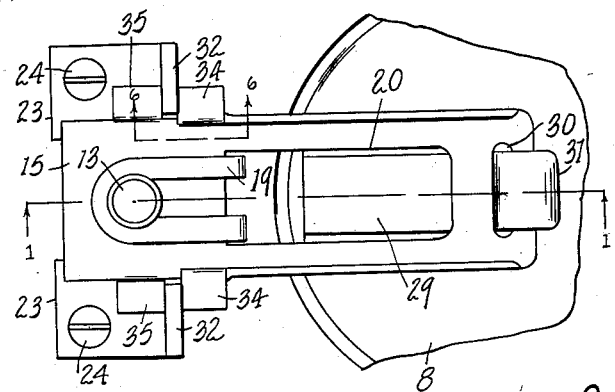

2,005,926

UNITED STATES PATENT OFFICE 2,005,926

STEAM TRAP

Adam E. Armstrong, Three Rivers, Mich.

Application June 15, 1933, Serial No. 675,928

15 Claims. (Cl. 137—103)

The main objects of this invention are:

First, to provide in a steam trap an improved discharge valve mechanism which is positively opened under high pressures.

Second, to provide an improved discharge valve mechanism having these advantages in which the valve is fully opened to permit the free discharge of the water, and opens and closes without fluttering or chattering.

Third, to provide a structure having these advantages which is very simple in its parts and the parts are easily assembled.

Objects pertaining to details and economies of my invention will definitely appear from the description to follow. The invention is defined in the claims.

A structure embodying the features of my invention is clearly illustrated in the accompanying drawings, in which:

Fig. 1 is a view mainly in vertical section on a line corresponding to line 1—1 of Fig. 2 of a steam trap embodying my invention.

Fig. 2 is a fragmentary plan view.

Fig. 3 is an enlarged fragmentary section corresponding to that of Fig. 1 showing the relation of the valve, the valve lever and its fulcrum.

Fig. 4 is a perspective view of the valve and valve lever assembly.

Fig. 5 is a perspective view of the valve lever fulcrum member.

Fig. 6 is a plan view with the head or top of the trap removed and also the valve and its lever.

Fig. 7 is an enlarged detail section illustrating the relation of the valve lever to its fulcrum.

Fig. 8 is a fragmentary section corresponding to that of Fig. 7 showing a modified form or embodiment of my invention.

Referring to the drawings, the float chamber 1 is provided with an inlet 2 disposed centrally thereof and a discharge passage 3 formed in the embodiment illustrated in the wall of the chamber and having a shouldered seat 4 at its upper end to receive the upwardly facing annular valve seat member 5. This valve seat member is preferably formed as a separate element so that it may be formed of suitable material while the trap chamber or housing is formed as a casting.

The valve chamber is provided with a movable head or top 6 removably secured by bolts 7. The float 8 is of the inverted bucket type disposed to float within the chamber, its lower position being indicated by dotted lines 9. Its elevated position is indicated by dotted lines 10, in which position it rests against the stop 11 formed on the head or top of the chamber. It will be understood that when steam enters the chamber the float is in normal conditions lifted against this stop.

The valve 12 is spherically curved and is provided with a stem 13 arranged through the hole 14 in the valve lever 15. The stem has an annular groove 18 adapted to receive the forked key 19, which is arranged on the top of the lever, the groove being positioned so that when the key is inserted the valve is securely locked to the lever. The valve lever has a longitudinal slot 20 therein, the ends of the arms of the key being bent down at 21 to prevent accidental withdrawal of the key.

The lever fulcrums on the fulcrum member 22 which has ears 23 adapted to receive the screws 24 which are threaded into holes 25 in the body of the float chamber. This fulcrum overhangs the valve seat member 5 and constitutes a retaining means therefor. In the embodiment illustrated the fulcrum member is stepped providing three fulcrum points as 26, 27 and 28. It will be noted that the fulcrum point 26 is very close to the valve so that on the valve opening movement of the lever a very powerful leverage is had.

It will be understood that after the valve has been "cracked" less power is required to operate it, and, therefore, the longer or less powerful leverage is practical and is desirable in that greater movement of the valve may be had so that the valve is fully opened without excessive movement of the lever.

The float 8 is connected to the valve lever by a lost motion connection, this in the embodiment of my invention illustrated consisting of an angled arm 29 mounted to extend upwardly centrally of the float and arranged loosely through the opening 30 in the outer end of the lever. The laterally disposed portion 31 of the arm overlies the lever so that when the float falls, as will result when the chamber fills with water and the steam which initially lifted the float is condensed, the valve is opened as indicated by dotted lines in Fig. 1. However, considerable independent movement of the valve lever and float is permissible so that as the float is lifted by an inrush of steam the discharge of water will seat the valve, and any agitation of the float is not transmitted to the valve, the valve remaining seated until the float falls a substantial distance. In the embodiment illustrated the lever merely rests upon the fulcrum, being positioned thereon by means of the upwardly projecting arms 32 on the fulcrum member suitably spaced to receive the lever.

The lever has stops 34 which limit the upward movement of the lever, these stops engaging the outside of the arms 32. The lever has downwardly offset lugs 35 disposed on the inner side of the arms 32 so as to prevent longitudinal shifting of the lever on its fulcrum while permitting free rocking movement thereon. In its valve closing position the lever is accurately positioned for the proper seating of the valve. The valve, being spherical, may swing into and out of its seat and at the same time may accurately seat with a vertical movement. It will be understood that the fulcrum 26 is so positioned as to permit this seating.

In Fig. 8 the fulcrum surface 36 is curved instead of stepped, this resulting in continuously moving the fulcrum point of the lever from the valve on the opening movement of the lever instead of the stepped movement resulting from the spaced fulcrum points as shown in Fig. 7.

My improvements are well adapted for embodiment in small traps where positive operation is an essential. The parts are economical and very easily assembled. As the valve opens fully, wear or scoring on the valve and valve seat is minimized.

I have illustrated and described my improvements in very practical embodiments thereof. I have not attempted to illustrate or describe other embodiments or adaptations of my invention as it is believed that this disclosure will enable those skilled in the art to embody or adapt the same as may be desired.

Having thus described my invention what I claim as new and desire to secure by Letters Patent is:

1. The combination with a float chamber provided with an inlet at the bottom and a discharge at the top having an annular upwardly facing valve seat, of an inverted bucket-type float having a central upwardly projecting arm thereon provided with a lateral projection at its upper end, a valve lever having an opening at its outer end through which said arm is disposed for vertical movement, the laterally projecting portion of the arm constituting a stop coacting with the lever, a fulcrum member for said lever having a plurality of fulcrums with which the lever successively coacts on the opening movement of the lever, said fulcrum member having upwardly projecting arms between which the lever is disposed, the lever having laterally projecting stops coacting with said arms when the lever is in valve closing position, and a spherically curved valve carried by said lever and arranged thereon to coact with said valve seat and positioned close to the inner fulcrum.

2. The combination with a float chamber provided with an inlet at the bottom and a discharge at the top having an annular upwardly facing valve seat, of an inverted bucket-type float having a central upwardly projecting arm thereon provided with a lateral projection at its upper end, a valve lever having an opening at its outer end through which said arm is disposed for vertical movement, the laterally projecting portion of the arm constituting a stop coacting with the lever, a fulcrum member for said lever having a plurality of fulcrums with which the lever successively coacts on the opening movement of the lever, and a spherically curved valve carried by said lever and arranged thereon to coact with said valve seat and positioned close to the inner fulcrum.

3. The combination with a float chamber provided with an inlet at the bottom and a discharge at the top having an upwardly facing valve seat, of an inverted bucket-type float, a valve lever, a fulcrum member for said lever having a plurality of fulcrums with which the lever successively coacts on the opening movement of the lever, said fulcrum member having upwardly projecting arms between which the lever is disposed, the lever having laterally projecting stops coacting with said arms when the lever is in valve closing position, a valve carried by said lever and arranged thereon to coact with said valve seat and positioned close to the inner fulcrum, a lost motion connection for said float to said lever, and a stop limiting the upward movement of said lever.

4. The combination with a float chamber provided with a discharge at the top having an annular valve seat, of a float, a valve lever operatively connected to said float, a fulcrum member for said lever having a plurality of fulcrums with which the lever successively coacts on the opening movement of the lever, said fulcrum member having upwardly projecting arms between which the lever is disposed, the lever having laterally projecting stops coacting with said arms when the lever is in valve closing position, and a valve carried by said lever and arranged thereon to coact with said valve seat.

5. The combination with a float chamber provided with a discharge at the top having an upwardly facing valve seat, of an inverted bucket-type float, a valve lever, a fulcrum member for said lever having upwardly projecting arms between which the lever is disposed, the lever having laterally projecting stops coacting with said arms when the lever is in valve closing position, a valve carried by said lever and arranged thereon to coact with said valve seat, a lost motion connection for said float to said lever, and a stop limiting the upward movement of said lever.

6. The combination with a float chamber provided with a discharge at the top having an upwardly facing valve seat, of a float, a valve lever, a fulcrum member for said lever having upwardly projecting arms between which the lever is disposed, the lever having laterally projecting stops coacting with said arms when the lever is in valve closing position, and a valve carried by said lever and arranged thereon to coact with said valve seat.

7. The combination with a float chamber provided with an inlet at the bottom and a discharge at the top having an upwardly facing valve seat, an inverted bucket-type float, a stop limiting the upward movement of said float in said chamber, a valve chamber, an upwardly projecting arm disposed centrally on said float and having sliding engagement with said lever for actuating the lever when the float falls beyond a predetermined point, a spherical valve mounted on said lever to coact with said valve seat, a fulcrum member for said lever having a fulcrum surface coacting with the lever so that on the valve opening movement of the lever the fulcrum point of the lever moves away from the valve, the initial fulcrum point of the lever being close to the valve, and a stop limiting the valve closing movement of the lever.

8. The combination with a float chamber having an inlet at the bottom and a discharge at the top, a discharge valve, a valve lever by which said valve is carried, said lever having a fulcrum coacting therewith and conformed and arranged so that the fulcrum point of the lever moves from the valve on the valve opening movement of the lever, the initial fulcrum point being close to the valve, and an inverted bucket-type float having a lost motion connection with said lever, said float and lever having stops in such relation to the lost motion connection that substantial movement of the float independent of the valve lever is permitted when the float is in elevated position.

9. The combination with a float chamber having an inlet at the bottom and a discharge at the top, a discharge valve, a valve lever by which said valve is carried, said lever having a fulcrum coacting therewith and conformed and arranged so that the fulcrum point of the lever moves from the valve on the valve opening movement of the lever, and an inverted bucket-type float having a lost motion connection with said lever, said float and lever having stops in such relation to the lost motion connection that substantial valve seating movement of the lever independent of the float is permitted when the float is in elevated position.

10. The combination with a float chamber provided with an inlet and having a discharge port surrounded by a valve seat, a valve coacting with said valve seat, a lever on which said valve is mounted for bodily movement of the lever, a fulcrum means with which said lever coacts whereby the throw of the valve is automatically increased as the lever is moved from its valve seating position, an inverted bucket-type float having a lost motion connection to said valve, and a stop other than the lever for limiting the upward movement of said float.

11. The combination with a float chamber provided with an upwardly facing discharge at the top having an annular valve seat, of an inverted bucket type float, a valve lever having an opening at its outer end, said float having an arm disposed through said opening and constituting a lost motion connection for said float to said valve lever, a fulcrum member for said lever having a plurality of fulcrums with which the lever successively coacts on the opening movement of the lever, said lever being supported for vertical floating movement above said fulcrum, and a spherically curved valve arranged on the lever in close proximity to the inner fulcrum to coact with said valve seat.

12. The combination with a float chamber provided with an upwardly facing discharge at the top having an annular valve seat, of an inverted bucket type float, a valve lever having a lost motion connection for said float to said valve lever, a fulcrum member for said lever having a plurality of fulcrums with which the lever successively coacts on the opening movement of the lever, said lever being supported for vertical floating movement above said fulcrum, and a spherically curved valve arranged on the lever in close proximity to the inner fulcrum.

13. The combination with a float chamber provided with an upwardly facing discharge at the top having an annular valve seat, of an inverted bucket type float, a valve lever having a lost motion connection for said float to said valve lever, a fulcrum member for said lever having a plurality of fulcrums with which the lever successively coacts on the opening movement of the lever, said fulcrum member having upwardly projecting arms in the vertical plane of said fulcrum between which the lever is disposed, said lever having downwardly offset laterally projecting stops at the inside of said fulcrum member and upwardly offset laterally projecting stops at the outside of said fulcrum member, and a spherically curved valve mounted on said lever in close proximity to the inner fulcrum.

14. The combination with a float chamber provided with an upwardly facing discharge at the top having an annular valve seat, of an inverted bucket type float, a valve lever having a lost motion connection for said float to said valve lever, a fulcrum member for said lever having upwardly projecting arms between which the lever is disposed, said lever having downwardly offset laterally projecting stops at the inside of the said fulcrum member and upwardly offset laterally projecting stops at the outside of said fulcrum member, and a valve mounted on said lever.

15. The combination with a float chamber provided with an upwardly facing discharge at the top having an annular valve seat, of an inverted bucket type float, a valve lever having a lost motion connection for said float to said valve lever, a fulcrum member for said lever having a plurality of fulcrums with which the lever successively coacts on the opening movement of the lever, said fulcrum member having upwardly projecting arms between which the lever is disposed, said lever having laterally projecting stops at both sides of said fulcrum member, and a valve mounted on said lever at the inner side of said fulcrum.

ADAM E. ARMSTRONG.